March 4, 1969     H. L. R. SMYTH     3,431,481

COULOMETER

Filed May 31, 1966

INVENTOR
HENRY L. R. SMYTH
BY J. R. Hughes
AGENT

United States Patent Office 3,431,481
Patented Mar. 4, 1969

3,431,481
COULOMETER
Henry Lyall Ross Smyth, Ottawa, Ontario, Canada, assignor to Canadian Patents and Development Limited, Ottawa, Ontario, Canada
Filed May 31, 1966, Ser. No. 553,736
Claims priority, application Canada, Nov. 19, 1965, 945,766
U.S. Cl. 320—48
Int. Cl. H02j 7/04, 7/16; G01r 27/22
5 Claims

ABSTRACT OF THE DISCLOSURE

A coulometer device comprising two batteries connected in series but with reversed polarity with the overall assembly connected in series with the battery or other electric supply whose amphere-hour input or output is to be measured. The voltage across the assembly which is normally near zero and changes relatively quickly to a positive or negative value when a predetermined amount of electric current has passed through the assembly in the same direction, is used for control or switching purposes, e.g., the connecting into the circuit of a battery charger.

---

This invention relates to a coulometer and more particularly to a method and apparatus for measuring and indicating the charge or discharge condition of a secondary battery.

Coulometers for measuring integrated current (current × time) are known and have their chief application in battery charging circuits. There are various types of coulometers in existence and these operate on various principles, e.g., the change in weight at an electrode, the change in concentration in one compartment of a cell, the movement of a gap in a mercury column, or from the volume of gas liberated when current is passed. It will be realized that these devices although precise involve inconvenient and somewhat difficult measurement techniques.

An accurate and useful coulometric device is described and claimed in Canadian Patent No. 715,196, which issued on August 3, 1965, to Dr. Ian H. S. Henderson. This device comprises a pair of reversible electrodes which when placed in a suitable electrolyte have substantially the same electrode potential. When a predetermined amount of electricity has passed through the cell in one (or other) direction, there is an abrupt change in voltage between the electrodes. This effect may be used for indication purposes in various devices, e.g., a battery charging current for industry when a certain amount of electricity (current × time) has been taken from an applied to a secondary battery.

The charge state of some types of secondary (rechargeable) batteries, for example the standard lead-acid battery, can be measured by measuring the voltage between the electrodes or by measuring the specific gravity of the electrolyte. However, there are several types of batteries, e.g., alkaline batteries such as nickel-cadmium, where electrode potential is not relatable to the charge state of the battery and other methods of measurement have to be restored to. The most positive way to make the necessary measurement is to measure the complete integrated current flowing into or out of the battery in question.

It is therefore an object of the invention to provide a simple, accurate, and readily available coulometer device capable of indicating when a predetermined amount of electricity (coulombs or current × time) has passed through it in either direction.

This and other objects of the invention are achieved by providing a coulometer device comprising a first and second battery connected in series but with reversed polarity, said first and second battery assembly being placed in series with the main battery supply whose ampere-hour input or output is to be measured. Applicant has found that voltage across the outer terminals of the first and second battery assembly which is normally substantially equal to zero (neglecting the voltage drop due to the internal resistance of the batteries) changes relatively quickly to a positive or negative value as the case may be when a predetermined amount of electricity has passed through the assembly in the same direction. This voltage change can be detected, and if desired, amplified, and used for switching purposes, e.g., the connection or disconnection of a battery charger.

In drawings which illustrate embodiments of the invention,

Figure 1:
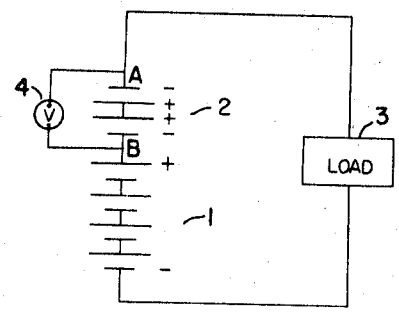
FIGURE 1 is a schematic circuit diagram.

Referring to FIGURE 1 a battery designated as 1 is connected to an electrical load 3. A coulometer device made up of a pair of batteries 2 connected in series but with reversed polarity (back-to-back) is connected in the line such that the complete load current from the battery 1 passes through it. If one of the coulometric batteries (the lower one of FIGURE 1) is fully charged and the other is fully discharged, then as current flows to the load from battery 1, the lower will be discharged and the upper charged. During this action the voltage across the outer electrodes A and B of the pair of coulometer batteries will be substantially zero because of the reversed polarity relationship. It should be pointed out that there will be a small voltage drop across the terminals A and B due to the internal resistance of the batteries and the load current passing through. This voltage will be polarized in relation to the direction of the load current. It can be readily accommodated by suitable selection of circuit components and switching bias levels. As the action carries on to the point where the lower batery approaches complete discharge and the upper full charge, the voltage across the electrodes A and B will change relatively quickly to a more positive or negative value. This change in voltage can be detected by suitable means such as a voltmeter 4. At this point it will be known that a definite amount of electricity has been supplied by the battery 1, to the load. If the characteristics and capacities of the pair of coulometer batteries are carefully chosen then this amount will be definitely predetermined and a useful coulometer device results.

Figure 2:
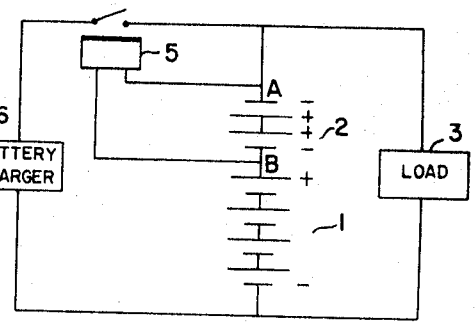
FIGURE 2 is a circuit diagram in simplified form of the invention operating in a battery charging circuit.

The most obvious application of this type of device is in a battery charging circuit and is most useful for those types of batteries that do not significantly change in output voltage over their operating range. FIGURE 2 shows in schematic form such an application of the invention. When the predetermined number of ampere-hours is supplied by battery 1 to load 3 and battery 1 has been discharged by this amount, there is a change in voltage across the terminals A and B and this can be detected by sensing device 5 shown schematically which can in turn operate as a switch to connect the battery charger 6 into the circuit to recharge the battery 1.

In the coulometer device described the pair of back-to-back coulometer batteries is shown with the negative plates outwards. It will be readily realized that the device will work as well with the positive plates outward provided other circuit components are charged to suit. In practice the two coulometer batteries would be of the same type, have matching characteristics, and be of equal capacity. Although different type or size of bateries might be used this would result in akward and inconvenient measuring arrangements. The electrical capacity of the coulometer batteries should be equal to or preferably somewhat less than that of the main supply batteries.

Although the invention is chiefly applicable to a battery charging circuit other applications might suggest themselves. These would include among others a pulse measuring circuit and a timing device where a constant current is being measured.

What is claimed is:

1. coulometer device for measuring the current output or input of a current source comprising a first and second battery connected in series and with reversed polarity, said first and second battery assembly being placed in series with the said current source such that the current flowing into or out of the said current source also passes through the said first and second battery assembly and means for detecting the relatively rapid voltage change across the outer terminals of the said first and second battery assembly that occurs when one of the batteries of the said assembly approaches full charge and the other full discharge.

2. A coulometer device as in claim 1 wherein the said first and second batteries are substantially equal in electrical capacity.

3. A coulometer device for measuring the ampere-hour output or input of a battery supply comprising a first and second secondary battery connected in series and with reversed polarity, said first and second secondary battery assembly being placed in series with the said battery supply such that the current flowing into or out of the said battery supply also passes through the said first and second battery assembly and means for detecting the relatively rapid voltage change across the outer terminals of said first and second secondary battery assembly that occurs when one of the batteries of the said assembly approaches full charge and the other full discharge.

4. A coulometer device as in claim 3 wherein the electrical capacity of the batteries in the said first and second battery assembly is slightly less than that of the batteries in the said battery supply.

5. A coulometer device as in claim 3 wherein the said first and second bateries are substantially equal in electrical capacity.

References Cited

UNITED STATES PATENTS

| 3,258,670 | 6/1966 | Piechon | 320—6 |
| 2,864,055 | 12/1958 | Kordesch et al. | 324—29.5 |
| 3,069,622 | 12/1962 | Warsher | 324—94 X |
| 3,144,089 | 8/1964 | Lane et al. | 324—94 X |
| 3,234,538 | 2/1966 | Parke | 324—29.5 X |
| 3,302,091 | 1/1967 | Henderson | 320—48 |

JOHN F. COUCH, *Primary Examiner.*

STANLEY WEINBERG, *Assistant Examiner.*

U.S. Cl. X.R.

320—54; 324—29.5, 94